(12) United States Patent
Shapiro et al.

(10) Patent No.: US 8,334,053 B2
(45) Date of Patent: Dec. 18, 2012

(54) SEAL STRUCTURE AND ASSOCIATED METHOD

(75) Inventors: Andrew Philip Shapiro, Schenectady, NY (US); Dong-Sil Park, Niskayuna, NY (US); Jian Wu, Fremont, CA (US); Craig Stringer, DuBois, PA (US)

(73) Assignee: General Electric Company, Niskayuna, NY (US)

( * ) Notice: Subject to any disclaimer, the term of this patent is extended or adjusted under 35 U.S.C. 154(b) by 1015 days.

(21) Appl. No.: 12/351,131

(22) Filed: Jan. 9, 2009

(65) Prior Publication Data

US 2010/0178532 A1    Jul. 15, 2010

(51) Int. Cl.
*C03C 8/22* (2006.01)
*B32B 17/06* (2006.01)

(52) U.S. Cl. ......... 428/426; 501/16; 428/34.4; 428/432; 428/701; 428/702; 428/704; 429/185; 427/126.2

(58) Field of Classification Search ............ 501/16
See application file for complete search history.

(56) References Cited

U.S. PATENT DOCUMENTS

| | | | |
|---|---|---|---|
| 4,074,026 A * | 2/1978 | Bones | 429/104 |
| 4,268,313 A | 5/1981 | Park et al. | |
| 5,194,337 A | 3/1993 | Yoshida et al. | |
| 5,380,596 A | 1/1995 | Yoshida et al. | |
| 2010/0086846 A1 * | 4/2010 | Kumar et al. | 429/185 |
| 2010/0119847 A1 * | 5/2010 | Wu et al. | 428/428 |
| 2010/0120602 A1 * | 5/2010 | Park et al. | 501/21 |

FOREIGN PATENT DOCUMENTS

| | | |
|---|---|---|
| EP | 0729923 B1 | 8/1999 |
| JP | 11135084 A * | 5/1999 |

OTHER PUBLICATIONS

Man Wu et al.; Seal Structure and Associated Method; pending U.S. Appl. No. 12/270,247; 16 pages.

* cited by examiner

*Primary Examiner* — David Sample
(74) *Attorney, Agent, or Firm* — Francis T. Coppa

(57) ABSTRACT

A seal structure is provided for an energy storage device. The seal structure includes a first sealing glass composition and a second sealing glass composition joining an ion-conducting first ceramic to an electrically insulating second ceramic. The first sealing glass composition includes less than or equal to about 20 weight percent silica based on the weight of the first sealing glass composition. The second sealing glass composition includes greater than or equal to about 40 weight percent silica based on the weight of the second sealing glass composition. A method for making the seal structure is provided. An article comprising the seal structure is also provided.

25 Claims, 2 Drawing Sheets

SEAL STRUCTURE AND ASSOCIATED METHOD

BACKGROUND

1. Technical Field

The invention includes embodiments that relate to a seal structure for an energy storage device. The invention includes embodiments that relate to a sealing material to be used in the seal structure of an energy storage device. The invention includes embodiments that relate to a method of sealing an energy storage device.

2. Discussion of Related Art

Development work has been undertaken on high temperature rechargeable batteries using sodium for the negative electrode. The liquid sodium negative electrode is separated from a positive electrode by a sodium-ion conducting solid electrolyte. Suitable material includes beta-alumina and beta"-alumina, known together as beta alumina solid electrolyte (BASE), which is used as the separator of electrodes. Some electrochemical cells have a metallic casing. The ceramic parts of the cell can be joined or bonded via a sealing material. The sealing material may include a glassy material having undesirable characteristics associated with its use. Bonded ceramic parts formed from dissimilar materials in a high temperature cell may crack due to thermal stress caused by mismatch in the coefficient of thermal expansion. The coefficient of thermal expansion for two ceramic parts can be substantially dissimilar. The sealing material may have a limited life, and bond failure or degradation may cause cell failure due to a direct conduction path between the cathode and anode electrodes.

It may be desirable to have a sealing material for an energy storage device that differs from those sealing materials that are currently available. It may be desirable to have a seal structure that differs from those seal structures that are currently available. It may be desirable to have a method of sealing an energy storage device that differs from those methods that are currently available.

BRIEF DESCRIPTION

In accordance with an embodiment of the invention, a seal structure is provided for an energy storage device. The seal structure includes a first sealing glass composition and a second sealing glass composition joining an ion-conducting first ceramic to an electrically insulating second ceramic. The first sealing glass composition includes less than or equal to about 20 weight percent silica based on the weight of the first sealing glass composition. The second sealing glass composition includes greater than or equal to about 40 weight percent silica based on the weight of the second sealing glass composition.

In accordance with an embodiment of the invention, a process is provided that is capable of forming a seal structure for an energy storage device. The seal structure includes a first sealing glass composition and a second sealing glass composition. The process includes forming a first sealing glass composition including less than or equal to about 20 weight percent silica and forming a second sealing glass composition including greater than about 40 weight percent silica. The process further includes joining an ion-conducting first ceramic to an electrically insulating second ceramic in a sodium-halide battery using the first sealing glass composition on the sodium side and the second sealing glass composition on the halide side of the battery.

In accordance with an embodiment of the invention, an article is provided that includes a seal structure for use in an energy storage device. The article includes an ion-conducting first ceramic and an electrically insulating second ceramic connected by a seal structure. The seal structure includes a first sealing glass composition and a second sealing glass composition. The first sealing glass composition includes less than or equal to about 20 weight percent silica based on the weight of the first sealing glass composition. The second sealing glass composition includes greater than or equal to about 40 weight percent silica based on the weight of the second sealing glass composition.

DETAILED DESCRIPTION

Figure 1:
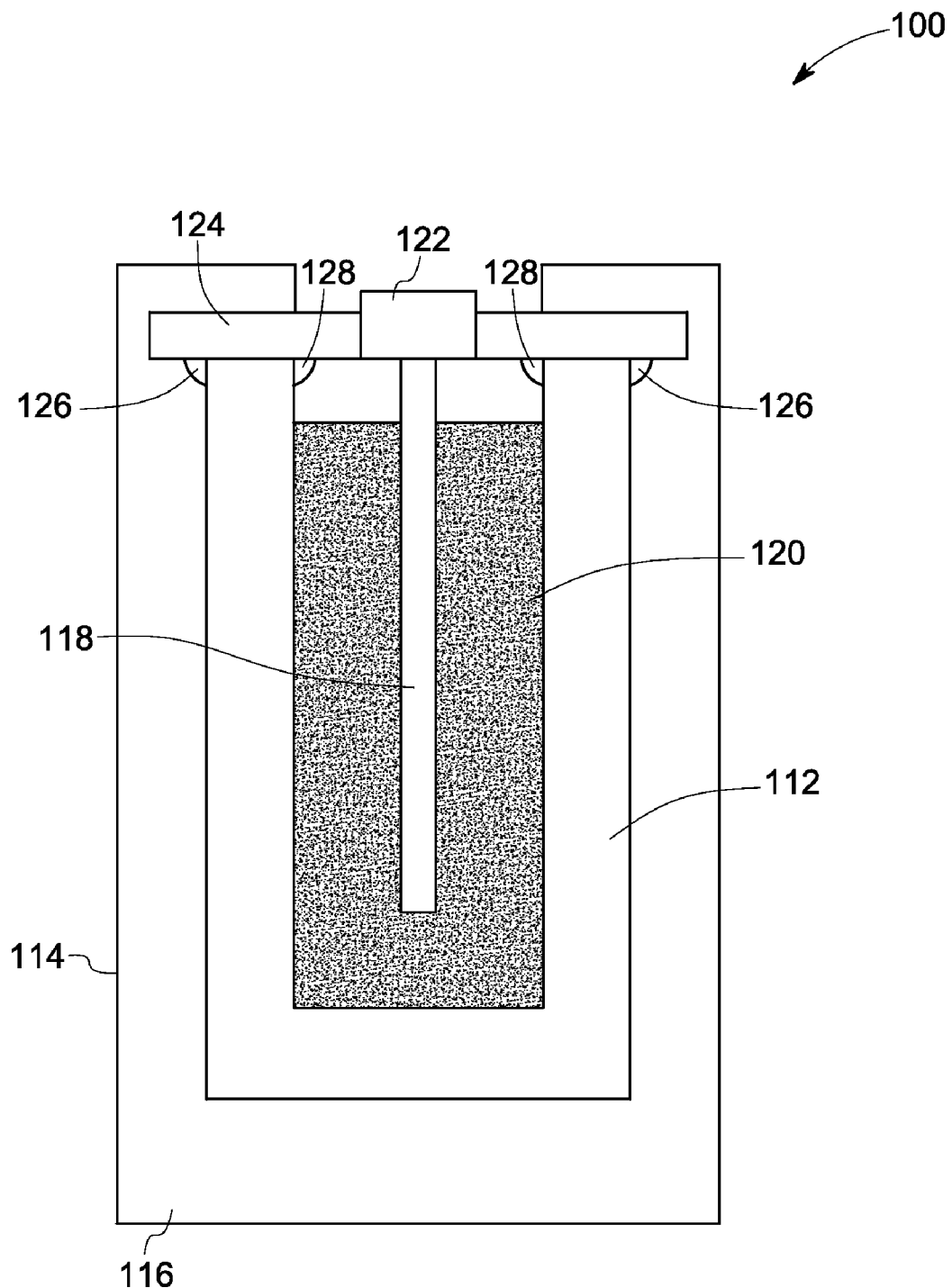
FIG. 1 is a schematic view showing a seal structure in accordance with one embodiment of the invention.

The invention includes embodiments that relate to a seal structure for an energy storage device. The invention includes embodiments that relate to a sealing material for an energy storage device. The invention includes embodiments that relate to a method of sealing an electrochemical cell.

As used herein, cathodic material is the material that supplies electrons during charge and is present as part of a redox reaction. Anodic material accepts electrons during charge and is present as part of the redox reaction.

Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

In accordance with an embodiment of the invention, a seal structure is provided for an energy storage device. The seal structure includes a first sealing glass composition and a second sealing glass composition joining an ion-conducting first ceramic to an electrically insulating second ceramic. The first sealing glass composition includes less than or equal to about 20 weight percent silica based on the weight of the first sealing glass composition. The second sealing glass composition includes greater than or equal to about 40 weight percent silica based on the weight of the second sealing glass composition. The sealing glass compositions of the present invention makes it possible to construct a high power density or high energy density battery with long life time.

In one embodiment, the first sealing glass composition includes less than about 20 weight percent silica, greater than about 35 weight percent boric oxide, greater than about 10 weight percent alumina, from about 0 weight percent to about 12 weight percent sodium oxide, and from about 0 weight percent to about 20 weight percent alkali earth oxides based on the total weight of the first sealing glass composition. In one embodiment, the first sealing glass composition includes from about 5 weight percent to about 20 weight percent silica. In one embodiment, the first sealing glass composition includes from about 5 weight percent to about 10 weight percent silica, from about 10 weight percent to about 15 weight percent silica, and from about 15 weight percent to about 20 weight percent silica based on the total weight of the first sealing glass composition.

In one embodiment, the first sealing glass composition includes from about 35 weight percent to about 55 weight percent boric oxide based on the total weight of the first sealing glass composition. In one embodiment, the first sealing glass composition includes from about 35 weight percent to about 40 weight percent boric oxide, from about 40 weight percent to about 45 weight percent boric oxide, from about 45 weight percent to about 50 weight percent boric oxide, and from about 50 weight percent to about 55 weight percent boric oxide based on the total weight of the first sealing glass composition.

In one embodiment, the first sealing glass composition includes from about 0 weight percent to about 4 weight percent sodium oxide, 4 weight percent to about 8 weight percent sodium oxide, and from about 8 weight percent to about 12 weight percent sodium oxide based on the total weight of the first sealing glass composition. In one embodiment, the first sealing glass composition includes from about 0 weight percent to about 5 weight percent alkali earth oxides, from about 5 weight percent to about 10 weight percent alkali earth oxides, from about 10 weight percent to about 15 weight percent alkali earth oxides, and from about 15 weight percent to about 20 weight percent alkali earth oxides based on the total weight of the first sealing glass composition.

In one embodiment, the second sealing glass composition includes greater than about 40 weight percent silica, less than about 25 weight percent boric oxide, greater than about 10 weight percent alumina, about 0 weight percent to about 12 weight percent sodium oxide, and about 0 weight percent to about 20 weight percent alkali earth oxides based on the total weight of the second sealing glass composition. In one embodiment, the second sealing glass composition includes from about 40 weight percent to about 70 weight percent silica. In one embodiment, the second sealing glass composition includes from about 40 weight percent to about 70 weight percent silica, from about 45 weight percent to about 50 weight percent silica, from about 50 weight percent to about 55 weight percent silica, from about 55 weight percent to about 60 weight percent silica, from about 60 weight percent to about 65 weight percent silica, and from about 65 weight percent to about 70 weight percent silica based on the total weight of the second sealing glass composition.

In one embodiment, the second sealing glass composition includes from about 10 weight percent to about 25 weight percent boric oxide. In one embodiment, the second sealing glass composition includes from about 10 weight percent to about 15 weight percent boric oxide, from about 15 weight percent to about 20 weight percent boric oxide, and from about 20 weight percent to about 25 weight percent boric oxide based on the total weight of the second sealing glass composition. In one embodiment, the second sealing glass composition includes from about 5 weight percent to about 25 weight percent alumina based on the total weight of the second sealing glass composition. In one embodiment, the second sealing glass composition includes from about 5 weight percent to about 10 weight percent alumina, from about 10 weight percent to about 15 weight percent alumina, from about 15 weight percent to about 20 weight percent alumina, and from about 20 weight percent to about 25 weight percent alumina based on the total weight of the second sealing glass composition.

In one embodiment, the second sealing glass composition includes from about 0 weight percent to about 4 weight percent sodium oxide, from about 4 weight percent to about 8 weight percent sodium oxide, and from about 8 weight percent to about 12 weight percent sodium oxide based on the total weight of the second sealing glass composition. In one embodiment, the second sealing glass composition includes from about 0 weight percent to about 5 weight percent alkali earth oxides, from about 5 weight percent to about 10 weight percent alkali earth oxides, from about 10 weight percent to about 15 weight percent alkali earth oxides, and from about 15 weight percent to about 20 weight percent alkali earth oxides based on the total weight of the second sealing glass composition.

In one embodiment, the sealing glass is used in a sodium-halide battery. In one embodiment, the first sealing glass composition is used on the sodium side of a sodium-halide battery. In one embodiment, the second sealing glass composition is used on the halide side of a sodium-halide battery. In one embodiment, the first sealing glass composition resists corrosion or degradation by contact with sodium at the working temperature. In one embodiment, the second sealing glass composition resists corrosion or degradation by contact with halide at the working temperature.

In one embodiment, since the seal structure used for joining the two ceramic members includes a first sealing glass composition consisting of less than or equal to about 20 weight percent silica based on the weight of the first sealing glass composition and a second sealing glass composition consisting greater than or equal to about 40 weight percent silica based on the weight of the second sealing glass composition the corrosion rate due to sodium or the metal halide may be reduced, and thus reliability of the glass joint portion may be improved. Therefore, the life of the sodium-metal halide cell may be prolonged. In various embodiments, it may be noted that each of the constituent oxides of the first sealing glass composition and the second sealing glass composition contribute to multiple properties such as thermal expansion, working temperature, and corrosion resistance.

In one embodiment, the seal structure consists of a first sealing glass composition and a second sealing glass composition that together can seal an ion-conducting first ceramic and an electrically insulating second ceramic. As used herein the phrase "can seal" means that the ion-conducting first ceramic is bonded and/or secured to the electrically insulating second ceramic using the first sealing glass composition and the second sealing glass composition. The ion-conducting first ceramic has a first thermal expansion coefficient and the electrically insulating second ceramic has a second thermal expansion coefficient that is different from the first thermal expansion coefficient. In one embodiment, the thermal expansion coefficients of the first sealing glass composition and the second sealing glass composition are about the same as the thermal expansion coefficient of the ion-conducting first ceramic. In one embodiment, the thermal expansion coefficient of the first sealing glass composition and the second sealing glass composition are about the same as the thermal expansion coefficient of the electrically insulating second ceramic. On the seal structure, the function relates to the ability to secure or bond to a mating surface. The seal structure includes the first sealing glass composition and the second sealing glass composition that define the boundaries of the ion-conducting first ceramic and the electrically insulating second ceramic.

In one embodiment, the first sealing glass composition has a thermal expansion coefficient in a range of from about 5.1 parts per million per degree Celsius to about 8.5 parts per million per degree Celsius. In one embodiment, the first sealing glass composition has a thermal expansion coefficient in a range of from about 5.1 parts per million per degree Celsius to about 6.0 parts per million per degree Celsius, from about 6 parts per million per degree Celsius to about 6.5 parts per million per degree Celsius, from about 6.5 parts per million per degree Celsius to about 7 parts per million per degree Celsius, from about 7 parts per million per degree Celsius to about 7.5 parts per million per degree Celsius, from about 7.5 parts per million per degree Celsius to about 8.0 parts per million per degree Celsius, and from about 8.0 parts per million per degree Celsius to about 8.5 parts per million per degree Celsius. In various embodiments, the first sealing glass composition may be finely tuned to obtain a close thermal expansion coefficient match with the ceramic parts.

In one embodiment, the second sealing glass composition has a thermal expansion coefficient in a range of from about 5.1 parts per million per degree Celsius to about 8.5 parts per million per degree Celsius. In one embodiment, the second sealing glass composition has a thermal expansion coefficient in a range of from about 5.1 parts per million per degree Celsius to about 6.0 parts per million per degree Celsius, from about 6 parts per million per degree Celsius to about 6.5 parts per million per degree Celsius, from about 6.5 parts per million per degree Celsius to about 7 parts per million per degree Celsius, from about 7 parts per million per degree Celsius to about 7.5 parts per million per degree Celsius, from about 7.5 parts per million per degree Celsius to about 8.0 parts per million per degree Celsius, and from about 8.0 parts per million per degree Celsius to about 8.5 parts per million per degree Celsius. In various embodiments, the second sealing glass composition may be finely tuned to obtain a close thermal expansion coefficient match with the ceramic parts.

In one embodiment, the first sealing glass composition has a working temperature of greater than about 400 degrees Celsius. In one embodiment, the first sealing glass composition has a working temperature in a range of from about 400 degrees Celsius to about 1100 degrees Celsius. In one embodiment, the first sealing glass composition has a working temperature in a range of from about 400 degrees Celsius to about 600 degrees Celsius, from about 600 degrees Celsius to about 800 degrees Celsius, from about 800 degrees Celsius to about 1000 degrees Celsius, and from about 1000 degrees Celsius to about 1100 degrees Celsius. In one embodiment, the second sealing glass composition has a working temperature of greater than about 400 degrees Celsius. In one embodiment, the second sealing glass composition has a working temperature in a range of from about 400 degrees Celsius to about 1100 degrees Celsius. In one embodiment, the second sealing glass composition has a working temperature in a range of from about 400 degrees Celsius to about 600 degrees Celsius, from about 600 degrees Celsius to about 800 degrees Celsius, from about 800 degrees Celsius to about 1000 degrees Celsius, and from about 1000 degrees Celsius to about 1100 degrees Celsius. As used herein the phrase "working temperature" is defined as the temperature that the metal oxide sealing glass attains during the working or sealing of the seal structure. This corresponds to a temperature where the viscosity of the glass is about 104 poise, and the glass can be freely worked or sealed. In one embodiment, the first sealing glass composition resists corrosion or degradation by contact with sodium at the cell operating temperature of about 300 degrees Celsius to about 350 degrees Celsius for sodium-metal halide batteries. In one embodiment, the second sealing glass composition resists corrosion or degradation by contact with metal halides at the cell operating temperature of about 300 degrees Celsius to about 350 degrees Celsius for sodium-metal halide batteries.

In accordance with an embodiment of the invention, a process is provided that is capable of forming a seal structure for an energy storage device. The seal structure includes a first sealing glass composition and a second sealing glass composition. The process includes forming a first sealing glass composition including less than or equal to about 20 weight percent silica and forming a second sealing glass composition including greater than about 40 weight percent silica. The process further includes joining an ion-conducting first ceramic to an electrically insulating second ceramic in a sodium-halide battery using the first sealing glass composition on the sodium side and the second sealing glass composition on the halide side of the battery. It should be noted that precursors of the metal oxides may also be employed to prepare the first sealing glass composition and the second sealing glass composition; for example, sodium bicarbonate may be used as a precursor to form sodium oxide.

In one embodiment, a method for making the first sealing glass composition and the second sealing glass composition for a sodium-metal halide cell may include blending silica, boric oxide, alumina, and sodium oxide or precursors of silica, boric oxide, alumina and sodium oxide, and melting the oxides to form a homogenous composition. In one embodiment, the oxides are melted at a temperature in a range from about 1300 degrees Celsius to about 1700 degrees Celsius. The molten glass is then cooled to prepare a homogenous first sealing glass composition or second sealing glass composition based on the proportion of the various oxides employed. In one embodiment, the molten glass is cooled at room temperature. In another embodiment, the molten glass composition is quenched between stainless steel plates at room temperature with the resulting glass mass being crushed to predetermined particle sizes to form a frit glass powder for sealing of the ceramic parts.

The first sealing glass composition in the form of frit glass powder may be placed between the ion-conducting first ceramic and the electrically insulating second ceramic on the sodium side of the sodium-metal halide battery. The second sealing glass composition in the form of frit glass powder may be placed between the ion-conducting first ceramic and the electrically insulating second ceramic on the halide side of the sodium-metal halide battery. The resultant assembly may be heated to the working temperature to form a viscous molten sealing glass consisting of the first sealing glass composition and second sealing glass composition. On cooling the assembly the ion-conducting first ceramic is bonded to the electrically insulating second ceramic by forming a seal structure between the ion-conducting first ceramic and the electrically insulating second ceramic. The seal structure may be in the form of a seal ring made of a glassy phase of the sealing glass consisting of the first sealing glass composition and the second sealing glass composition. In one embodiment, the seal structure joins or bounds the parts to be joined. Binding occurs where two or more pieces of bondable material are bonded together by liquefying a composition placed between the two or more pieces of bondable material at the region where they are to be bonded and allowing the liquid to solidify. At the end of the binding process the two pieces have become one continuous solid.

The ion-conducting first ceramic and the electrically insulating second ceramic can be defined by composition and/or function. The ion-conducting first ceramic and the electrically insulating second ceramic may be of different compositions. In one embodiment, the ion-conducting first ceramic includes a beta-alumina tube, plate or other structure with a suitable geometry.

The electrically insulating second ceramic may physically separate the anodic material from the cathodic material. The electrically insulating second ceramic may include or be formed from an electrically insulating material. Suitable material for use as electrically insulating material may include alpha-alumina. The dielectric strength of the material in the electrically insulating second ceramic is greater than the voltage or current potential differential between the anode and cathode material. If a lower dielectric constant material is used, the width of the electrically insulating second ceramic may be selected to be larger—and the reverse configuration is available. In one embodiment, the ion-conducting first ceramic includes a beta-alumina tube and the electrically insulating second ceramic includes an alpha-alumina plate and the sealing glass consisting of the first sealing glass composition and the second sealing glass composition is designed to join and seal the beta-alumina tube with the alpha-alumina plate.

Referring to FIG. 1 a schematic view showing a cross section of one embodiment of a seal structure 100 in accordance with the present invention. In FIG. 1 the seal structure is vertically disposed. FIG. 1 includes a beta alumina tube 112 functioning as the ion-conducting first ceramic, an outer metal container 114 functioning as a negative terminal for sodium 116 an anode material in the outer metal container, a metal rod functioning as a current collector 118, the metal rod surrounded by a cathode 120, a positive electrode material infused with molten halide, a metal cap 122, an alpha-alumina collar 124 functioning as the electrically insulating second ceramic, and the seal structure consisting of a first sealing glass composition 126 on the sodium side of the battery and a second sealing glass composition 128 for sealing the beta alumina tube and the alpha alumina collar.

The above cell is a sodium-metal halide cell. The process for manufacturing the above described cell generally includes the steps of: bonding the open end periphery of the beta alumina tube with the electrically insulating second ceramic in the form of an insulator ring made of alpha-alumina by means of the first and the second sealing glass compositions, bonding the insulator ring supporting the beta alumina tube with the metal containers functioning as the anode and the cathode by a solid phase reaction or the like at a high temperature under pressure, supplying the sodium and the metal halides into the anode metal container and the cathode metal container respectively, and hermetically closing the metal containers with the metal lids by means of welding to provide a cell.

Figure 2:
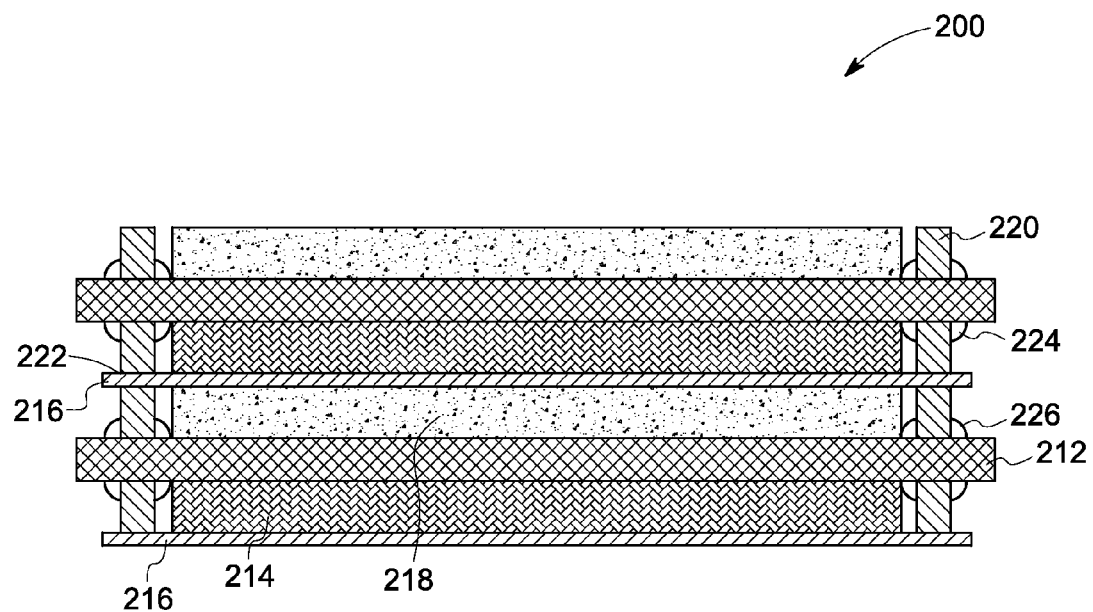
FIG. 2 is a schematic view showing a seal structure in accordance with one embodiment of the invention.

Referring to FIG. 2 a schematic view showing a cross section of one embodiment of a seal structure 200 in accordance with the present invention. In FIG. 2 the seal structure is horizontally disposed. FIG. 2 includes a beta alumina tube 212 functioning as the ion-conducting first ceramic, an outer metal container (not shown in figure) functioning as a negative terminal for sodium 214 an anode material in the outer metal container, bipolar plates functioning as the current collectors 216, cathode 218 positive cathode metal material infused with molten halide, an alpha-alumina collar 220 functioning as the electrically insulating second ceramic, a metal-alumina bond 222 to bind the alpha-alumina collar with the bipolar plates, and the seal structure consisting of a first sealing glass composition 224 on the sodium side of the battery and a second sealing glass composition 226 for sealing the beta alumina tube and the alpha alumina collar.

In the cells mentioned above, the sealing material is arranged between the beta alumina tube and the insulator ring made of alpha-alumina. The alumina material is capable of being corroded by the sodium or halide, and consequently the life of the cell is decreased. In one embodiment, the first sealing glass composition of the seal structure disclosed above has good durability against sodium corrosion and the second sealing glass composition of the seal structure disclosed above has good durability against halide corrosion. Further, while relating specifically to the illustrated embodiment, the seal structure contacts and secures the joint between the beta-alumina tube and the alpha-alumina insulator ring. In this configuration, the first and the second sealing glass compositions are selected to be electrically insulative and chemically resistant to sodium and metal halides respectively in the operating environment. Other considerations, such as working temperature, glass transition temperature and thermal expansion coefficient may be taken into account for sealing glass selection.

In accordance with an embodiment of the invention, an article is provided that includes a seal structure for use in an energy storage device. The article includes an ion-conducting first ceramic and an electrically insulating second ceramic connected by a seal structure. The seal structure includes a first sealing glass composition and a second sealing glass composition. The first sealing glass composition includes less than or equal to about 20 weight percent silica based on the weight of the first sealing glass composition. The second sealing glass composition includes greater than or equal to about 40 weight percent silica based on the weight of the second sealing glass composition.

EXAMPLES

The following examples illustrate methods and embodiments in accordance with the invention, and as such should not be construed as imposing limitations upon the claims. Unless specified otherwise, all components are commercially available from common chemical suppliers such as Sigma-Aldrich (United States), and the like.

Example 1

Preparation of Sodium Resistant Sealing Glass (First Sealing Glass Composition)

Silica, boric oxide, alumina, calcia, strontium oxide, and barium oxide are blended and melted to form a homogenous composition. The oxides are melted at about 1100 degrees Celsius. The resultant molten glass is quenched between steel plates at room temperature with the resulting solid glass being crushed to predetermined particle sizes to form a frit glass powder. The glass powder is placed between the beta alumina tube and the insular ring and the resultant assembly heated to about 1100 degrees Celsius for sealing of the ceramic parts. The sealing glass composition according to this formula can be finely tuned to meet a close thermal expansion coefficient match with the ceramic parts. The amount of silica, boric oxide, alumina, and sodium oxide in weight percent in the glass compositions prepared in Example 1 are provided in Table 1 below.

TABLE 1

| | Composition | |
|---|---|---|
| | Composition A | Composition B |
| Silica | 8 | 10 |
| Boric oxide | 45 | 45 |
| Alumina | 19 | 19 |
| Calcia | 6 | 7 |
| Strontium | 10 | 13 |
| Barium oxide | 12 | 6 |

Sodium resistant sealing glass composition made in accordance with Example 1, composition A, was subjected for 160 hours at 350 degrees Celsius in an atmosphere of sodium vapor. The sealing glass exhibited little, if any, discoloration.

However, a conventional sealing glass consisting of 50 weight percent silica, 10 weight percent alumina, 30 weight percent barium oxide, and 10 weight percent boric oxide when to an atmosphere of sodium vapors for 160 hours at 350 degrees Celsius turned dark brown indicating the presence of metallic sodium in the glass and thus providing a measure of sodium permeability.

Example 2

Preparation of Halide Resistant Sealing Glass
(Second Sealing Glass Composition)

Silica, boric oxide, alumina, and sodium oxide are blended and melted to form a homogenous composition. The oxides are melted at about 1400 degrees Celsius. The resultant molten glass is quenched between steel plates at room temperature with the resulting solid glass being crushed to predetermined particle sizes to form a frit glass powder. The glass powder is placed between the beta alumina tube and the insular ring and the resultant assembly heated to about 1100 degrees Celsius for sealing of the ceramic parts. The sealing glass composition according to this formula can be finely tuned to meet a close thermal expansion coefficient match with the ceramic parts. The amount of silica, boric oxide, alumina, and sodium oxide in weight percent in the glass compositions prepared in Example 2 are provided in Table 2 below.

TABLE 2

| | Composition | | |
|---|---|---|---|
| | Composition C | Composition D | Composition E |
| Silica | 48 | 48 | 48 |
| Boric oxide | 20 | 20 | 20 |
| Alumina | 24 | 22 | 20 |
| Sodium oxide | 8 | 10 | 12 |

The properties of the glass compositions provided in Table 2 were calculated using the SciGlass software (version 6.5). The properties are listed in Table 3.

TABLE 3

| Properties | Composition C | Composition D | Composition E |
|---|---|---|---|
| Co-efficient of thermal epansion ($E^{-6}$ Kelvin$^{-1}$) | 5.131 | 5.96 | 6.776 |
| Young's Modulus (giga Pascals) | 50.34 | 54.66 | 58.71 |
| Shear Modulus (giga Pascals) | 19.68 | 21.33 | 22.94 |
| Density (grams per cubic centimeter) | 2.309 | 2.393 | 2.401 |
| Glass tranisition temperature (Tg; degrees Celsius) | 611.8 | 605.1 | 605.7 |
| Working Temperature (degrees Celsius) | 945.7 | 913.2 | 888.3 |
| Weight loss after exposure to halide at 350 degrees Celsius for one week (weight percent) | 0.141 | 0.078 | 0.046 |

The results provided in Table 3 show that the second sealing glass compositions C, D and E, prepared in accordance with the present invention may have a working temperature of greater than about 850 degrees Celsius. Also these compositions exhibit a weight loss of about 0.046 weight percent to about 0.141 weight percent after exposure to halides at about 350 degrees Celsius for one week, in comparison to some sealing glasses that are known to show a weight loss of greater than about 2 weight percent after the same exposure.

The first sealing glass compositions A and B prepared in Example 1 and the second sealing glass compositions C, D and E prepared in Example 2 are used to seal the alpha-alumina plate with the BASE separator. The compositions prepared in Example 1 are used to seal the side in contact with the sodium and the compositions prepared in Example 2 are used to seal the side in contact with the halide. The sealing glass compositions disclosed herein may make it possible to construct a high power density or high energy density battery having a long life time.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A seal structure, comprising:
a first sealing glass composition and a second sealing glass composition joining an ion-conducting first ceramic to an electrically insulating second ceramic; and
the first sealing glass composition comprising less than or equal to about 20 weight percent silica based on the weight of the first sealing glass composition and the second sealing glass composition comprising greater than or equal to about 40 weight percent silica based on the weight of the second sealing glass composition.

2. The seal structure as defined in claim 1, wherein the first sealing glass composition comprises less than about 20 weight percent silica, greater than about 35 weight percent boric oxide, greater than about 10 weight percent alumina, about 0 weight percent to about 12 weight percent sodium oxide, and about 0 weight percent to about 20 weight percent alkali earth oxides based on the total weight of the first sealing glass composition.

3. The seal structure as defined in claim 2, wherein the first sealing glass composition comprises about 5 weight percent to about 20 weight percent silica, about 35 weight percent to about 55 weight percent boric oxide, about 10 weight percent to about 30 weight percent alumina, about 0 weight percent to about 12 weight percent sodium oxide and about 0 weight percent to about 20 weight percent alkali earth oxides based on the total weight of the first sealing glass composition.

4. The seal structure as defined in claim 2, wherein the alkali earth oxides comprise calcium oxide, strontium oxide, or barium oxide.

5. The seal structure as defined in claim 1, wherein the second sealing glass composition comprises greater than about 40 weight percent silica, less than about 25 weight percent boric oxide, greater than about 10 weight percent alumina, about 0 weight percent to about 12 weight percent sodium oxide, and about 0 weight percent to about 20 weight percent alkali earth oxides based on the total weight of the second sealing glass composition.

6. The seal structure as defined in claim 5, wherein the second sealing glass composition comprises about 40 weight percent to about 70 weight percent silica, about 10 weight percent to about 25 weight percent boric oxide, about 5 weight percent to about 25 weight percent alumina, about 0 weight percent to about 12 weight percent sodium oxide and about 0 weight percent to about 20 weight percent alkali earth oxides based on the total weight of the second sealing glass composition.

7. The seal structure as defined in claim 5, wherein the alkali earth oxides comprise calcium oxide, strontium oxide, or barium oxide.

8. The seal structure as defined in claim 1, wherein the first sealing glass composition and the second sealing glass composition can seal the ion-conducting first ceramic having a first thermal expansion coefficient and the electrically insulating second ceramic having a second thermal expansion coefficient that is different from the first thermal expansion coefficient.

9. The seal structure as defined in claim 8, wherein the thermal expansion coefficient of the first sealing glass composition and the second sealing glass composition is about the same as a thermal expansion coefficient of the ion-conducting first ceramic.

10. The seal structure as defined in claim 8, wherein the thermal expansion coefficient of the first sealing glass composition and the second sealing glass composition is about the same as a thermal expansion coefficient of the electrically insulating second ceramic.

11. The seal structure as defined in claim 1, wherein the first sealing glass composition has a thermal expansion coefficient in a range of from about 5.1 parts per million per degrees Centigrade to about 8.5 parts per million per degrees Centigrade.

12. The seal structure as defined in claim 1, wherein the second sealing glass composition has a thermal expansion coefficient in a range of from about 5.1 parts per million per degrees Centigrade to about 8.5 parts per million per degrees Centigrade.

13. The seal structure as defined in claim 1, wherein the first sealing glass composition has a working temperature of greater than about 400 degrees Celsius.

14. The seal structure as defined in claim 1, wherein the first sealing glass composition has a working temperature in a range of from about 400 degrees Celsius to about 1100 degrees Celsius.

15. The seal structure as defined in claim 1, wherein the second sealing glass composition has a working temperature of greater than about 400 degrees Celsius.

16. The seal structure as defined in claim 1, wherein the second sealing glass composition has a working temperature in a range of from about 400 degrees Celsius to about 1100 degrees Celsius.

17. The seal structure as defined in claim 1, wherein the first sealing glass composition and the second sealing glass composition are used in a sodium-halide battery.

18. The seal structure as defined in claim 1, wherein the first sealing glass composition is used on the sodium side of a sodium-halide battery.

19. The seal structure as defined in claim 1, wherein the second sealing glass composition is used on the halide side of a sodium-halide battery.

20. The seal structure as defined in claim 1, wherein the first sealing glass composition resists corrosion or degradation by contact with sodium at the working temperature.

21. The seal structure as defined in claim 1, wherein the second sealing glass composition resists corrosion or degradation by contact with halide at the working temperature.

22. A process, comprising:
   forming a first sealing glass composition comprising less than about 20 weight percent silica;
   forming a second sealing glass composition comprising greater than about 40 weight percent silica;
   joining an ion-conducting first ceramic to an electrically insulating second ceramic in a sodium-halide battery using the first sealing glass composition on the sodium side of the battery and the second sealing glass composition on the halide side of the battery.

23. The process as defined in claim 22, wherein the first sealing glass composition comprises less than about 20 weight percent silica, greater than about 35 weight percent boric oxide, greater than about 10 weight percent alumina, about 0 weight percent to about 12 weight percent sodium oxide, and about 0 weight percent to about 20 weight percent alkali earth oxides based on the total weight of the first sealing glass composition.

24. The seal structure as defined in claim 22, wherein the second sealing glass composition comprises greater than about 40 weight percent silica, less than about 25 weight percent boric oxide, greater than about 10 weight percent alumina, about 0 weight percent to about 12 weight percent sodium oxide, and about 0 weight percent to about 20 weight percent alkali earth oxides based on the total weight of the second sealing glass composition.

25. An article, comprising:
   an ion-conducting first ceramic and an electrically insulating second ceramic connected by a seal structure;
   the seal structure comprising a first sealing glass composition and a second sealing glass composition; and
   the first sealing glass composition comprising less than or equal to about 20 weight percent silica based on the weight of the first sealing glass composition and the second sealing glass composition comprising greater than or equal to about 40 weight percent silica based on the weight of the second sealing glass composition.

* * * * *